United States Patent [19]
Beck

[11] Patent Number: 5,564,457
[45] Date of Patent: Oct. 15, 1996

[54] VACUUM BREAKER VALVE WITH CIP CAPABILITY

[75] Inventor: Michael E. Beck, Marshfield, Wis.

[73] Assignee: G & H Products Corp., Kenocha, Wis.

[21] Appl. No.: 461,153

[22] Filed: Jun. 5, 1995

[51] Int. Cl.$^6$ ............................. F16K 24/06; F16K 15/18
[52] U.S. Cl. ..................... 137/15; 137/217; 137/240; 137/519.5; 137/526; 251/63.4
[58] Field of Search ........................... 137/15, 217, 240, 137/519.5, 522, 523, 526; 251/63.4

[56] References Cited

U.S. PATENT DOCUMENTS

| | | |
|---|---|---|
| 933,147 | 9/1909 | White .................................. 251/63.4 X |
| 1,490,848 | 4/1924 | Pettit .................................. 137/519.5 X |
| 2,686,528 | 8/1954 | Snyder . | 
| 3,145,724 | 8/1964 | Pelzer . |
| 3,870,066 | 3/1975 | Jurasek ................................. 137/241 X |
| 4,007,710 | 2/1977 | Johnson . |
| 4,339,111 | 7/1982 | Welch . |
| 4,457,340 | 7/1984 | Krueger . |
| 4,712,574 | 12/1987 | Perrott . |
| 4,838,306 | 6/1989 | Horn et al. ............................... 137/522 |
| 4,998,554 | 3/1991 | Rogers . |

*Primary Examiner*—Gerald A. Michalsky
*Attorney, Agent, or Firm*—Hovey, Williams, Timmons & Collins

[57] ABSTRACT

A vacuum breaker valve configured for clean in place capability is provided which includes a body having an internal passageway including a chamber, a valve member shiftable within the chamber, and a motive member positioned adjacent an upper end of the chamber for selectively displacing the valve member. The valve member closes the upper end of the chamber under backpressure to inhibit undesired discharge of the fluid in the chamber, while the motive member, such as a selectively shiftable plunger, serves to periodically displace the valve member away from the valve seat at the upper end of the chamber whereby fluid, such as a cleaning solution, may pass through the valve body and internally clean the vacuum breaker valve without the need for disassembly.

12 Claims, 2 Drawing Sheets

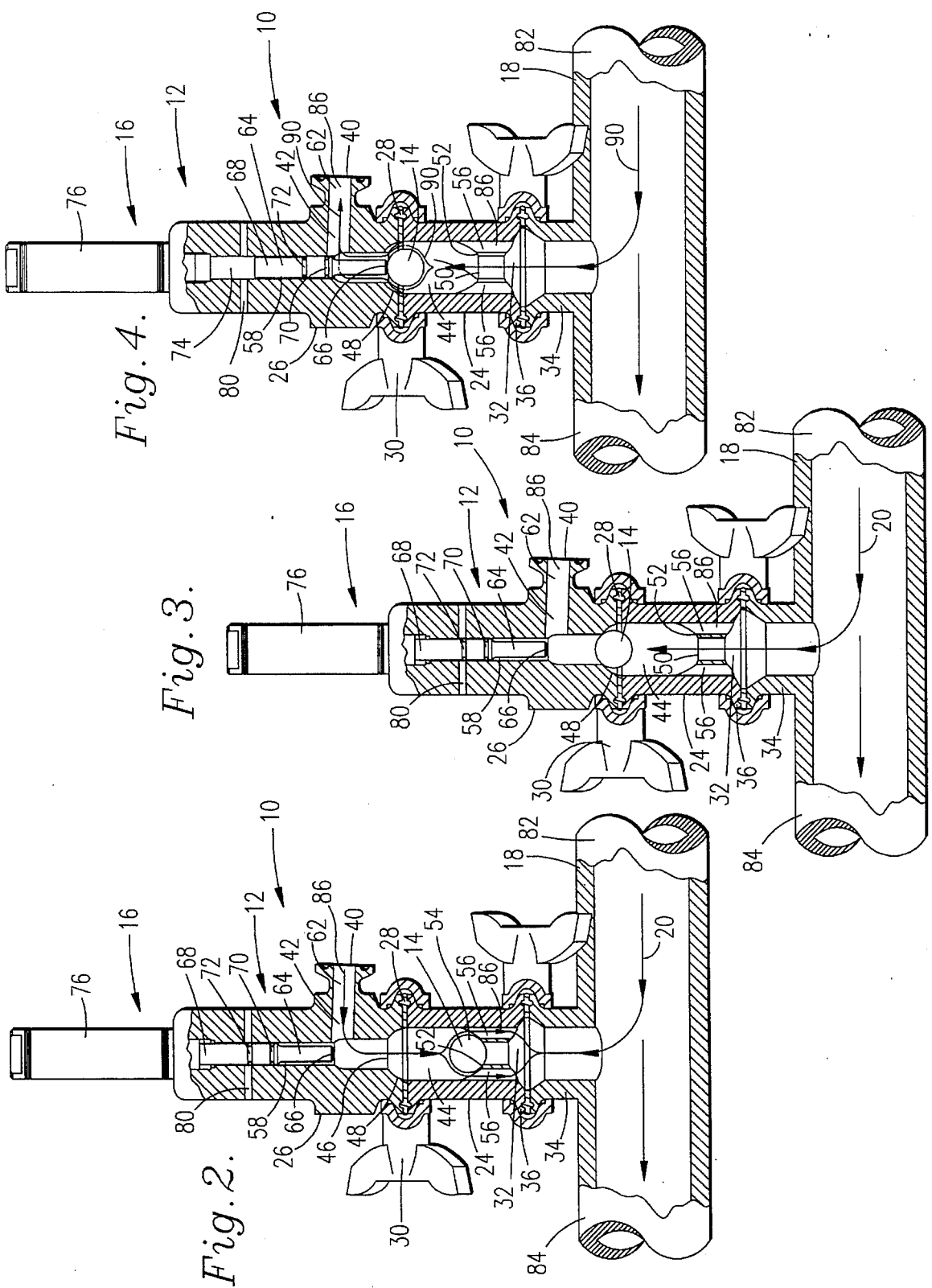

VACUUM BREAKER VALVE WITH CIP CAPABILITY

BACKGROUND OF THE INVENTION

1. Field of the Invention

This invention relates to vacuum breaker valves used in fluid treatment or processing facilities. More particularly, it is concerned with a simple and reliable vacuum breaker valve which is designed for cleaning in place, avoiding the need for removal and disassembly during the cleaning process.

2. Description of the Prior Art

The use of vacuum breaker valves in liquid processing plants is well known in the art. Such valves are sometimes also known as "anti-siphon" valves, which serve to inhibit the creation of a vacuum when pressure in a fluid conduit changes to cause a reversal of the flow of treated liquid. Vacuum breaker valves are often required in systems handling or treating potable water, pasteurized milk or other flowing liquid food products in order to prevent the flow of contaminated or untreated liquid into a storage container or supply line.

Vacuum breaker valves are often positioned in elevated locations which makes access for cleaning difficult. For example, a vacuum breaker valve may be located on an elevated conduit which is several meters above the plant floor and cannot be reached without ladders, cranes or the like. While many dairies or food treatment plants use clean in place (CIP) systems to maintain sanitation and cleanliness of the system, vacuum breaker valves have typically not been designed with this capability. As a result, cleaning personnel routinely overlook the need to maintain and clean the vacuum breaker valve until they clog, fail, or become severely contaminated.

U.S. Pat. No. 4,339,111 to Welch entitled Clean In Place Diaphragm Valve discloses a valve useful in the sanitary food industry having clean in place capabilities. However, the valve disclosed therein is designed for sampling purposes to obtain a selected sample of the liquid, and is not capable of performing vacuum breaker functions. Furthermore, its operating member is a diaphragm, which is subject to fatigue and failure.

Other vacuum breaker valves are shown in U.S. Pat. Nos. 2,686,528, 3,145,724, 4,712,574, and 4,998,554. However, none of these vacuum breaker valves are capable of CIP operation.

Thus, there has developed a real need for a simple, reliable, and economical vacuum breaker valve which is capable of clean in place operation.

SUMMARY OF THE INVENTION

This need has largely been met by the vacuum breaker valve in accordance with the present invention. That is to say, the vacuum breaker valve hereof provides for positive flow of air into the conduit to which the vacuum breaker valve is connected to avoid the creation of a vacuum in the conduit, inhibits normal flow of fluid out of the valve during pressurization, and permits the breaker valve to selectively permit the passage of CIP cleaning fluid through the valve passageway to a hole when desired, all in a simple and reliable unit.

Broadly speaking, the vacuum breaker valve hereof is adapted to be fluidically connected to a pipeline or other conduit handling a flow of treated or otherwise processed liquid. The vacuum breaker valve includes a valve body including a normally lowermost first end having an opening adapted for connecting or otherwise fluidically communicating with the conduit. The opening is configured to receive a flow of fluid into a passageway within the valve body, the passageway extending through the body to a hole in communication with the atmosphere. The passageway includes a chamber which shiftably receives a valve member, such as a small sphere, therein. The chamber presents an upper valve seal whereby the valve member may seal the upper end of the chamber in the passageway, preventing undesired escape of the fluid through the hole, but permitting the entry of air into the valve body upon depressurization of the fluid, thereby avoiding a negative pressure or siphoning effect in the passageway and conduit. The vacuum breaker valve also includes a motive member for displacing the valve member away from the upper valve seal, thereby selectively permitting the entry of fluid into the passageway between the upper valve seal and the hole. This permits cleaning in place.

Preferably the chamber includes a lower valve seal, with at least one satellite channel spaced and discrete from a lower throat. By providing multiple satellite channels, air may pass through alternate channels even if one is clogged. Air may thus pass from the hole, through the valve body, and from the opening to the conduit to prevent the occurrence of a negative pressure which might draw untreated liquid into the treatment system.

Most preferably, the valve body is provided in a plurality of sections to permit ease of disassembly, and the valve member is a synthetic resin sphere to ensure free movement within the chamber and adequate sealing, but resist floating on the liquid within the body. The valve member and the motive member are the only moveable parts within the vacuum breaker valve, which enhances its reliability and eliminates much expensive and difficult maintenance.

The motive member preferably includes an air cylinder with a spring return mounting a normally downwardly projecting rod which selectively displaces the valve member away from the upper valve seat. By using a selectively actuatable motive member, small intermittent displacements of the valve member may enable limited amounts of CIP fluid to pass by the valve member without excessive leakage which would disrupt the flow of CIP fluid throughout the system.

These features and others may be readily appreciated by those skilled in the art with reference to the drawings and the detailed description set forth below.

BRIEF DESCRIPTION OF THE DRAWINGS

FIG. 2 is a side elevational view in partial section showing the valve body, valve member and motive member, with the arrows illustrating the normal flow of air through the passageway of the valve and the flow of fluid through the conduit during vacuum break conditions;

FIG. 3 a side elevational view in partial section similar to FIG. 2, showing the position of the valve member in sealing engagement and the flow of fluid into the valve body when the flow in the conduit is inhibited and the valve becomes pressurized; and FIG. 4 is a side elevational view in partial section similar to FIG. 3, showing the motive member displacing the valve member away from the upper valve seat, thereby permitting the flow of CIP liquid past the valve member and through the opening.

DESCRIPTION OF THE PREFERRED EMBODIMENT

Figure 1:
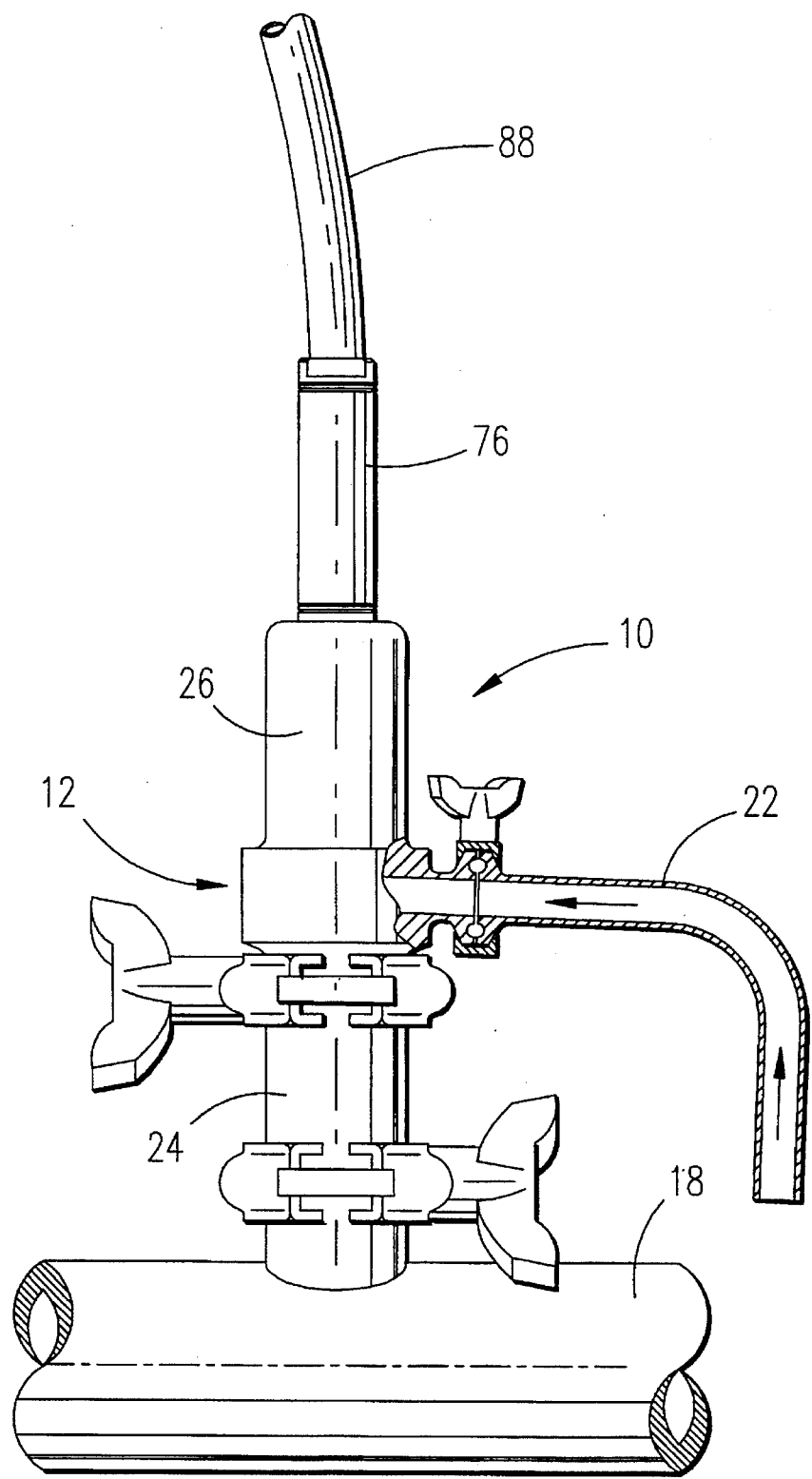
FIG. 1 a side elevational view in partial section of the vacuum breaker of the present invention connected to a conduit, the arrows illustrating the normal flow of air into the valve body to be drawn into the conduit.

Referring now to FIG. 2 of the drawing, a vacuum breaker valve 10 in accordance with the present invention broadly includes a valve body 12, valve member 14 and a motive member 16. The vacuum breaker valve 10 is shown connected to a conduit 18 carrying a flowing fluid, for example liquid milk, the flow of the fluid milk being illustrated by the arrows 20 in FIGS. 2 and 3. A tubular elbow 22 is shown mounted to the body 12 in FIG. 1.

In greater detail, the valve body 12 is preferably machined of stainless steel for sanitary purposes, and is provided in two component sections for ease of manufacture and assembly. The valve body 12 is normally oriented to present a lower section 24 coupled to the conduit 18 and an upper section 26 positioned thereon. A synthetic or latex rubber gasket 28 is provided between the upper section 26 and lower section 24, and a hinged clamp 30 is provided to secure the upper and lower sections together in alignment and fluid-tight relationship.

The body 12 presents an opening 32 in the lower section 24 which fluidically communicates with a T-section 34 in the conduit 18. The lower section 24 includes a flared mouth 36 which is coupled to a corresponding flared lip 38 on the T-section 34. The lip 38 and mouth 36 are sealed by a gasket 28 and held together by another hinged clamp 30. The upper section 26 presents a hole 40 which communicates with the atmosphere through elbow 22 which is omitted from FIGS. 2, 3 and 4. The body 12 defines an internal passageway 42 which extends between the opening 32 and the hole 40. Hole 40 is angled downward slightly to provide complete and sanitary draining of said hole 40.

The passageway 42 includes a normally upright elongated chamber 44 including an upper throat 46 defining an upper valve seat 48 and a lower throat 50 defining a lower valve seat 52. The chamber 44 preferably has a transverse configuration which is different or a transverse dimension which is wider than the upper throat 46 and lower throat 50 whereby the valve member 14 is retained therein. For example, the chamber 44 is most preferably circular in transverse cross-section having a diameter greater than the transverse diameter of the upper throat 46 and the lower throat 50.

Valve member 14 is most preferably a sphere 54 positioned in the chamber 44 for free shiftable movement therealong, the valve member 14 being preferably made of a durable synthetic resin material such as nylon or Delrin. The density of the material used for the sphere 54 is somewhat greater than the density of the fluid, and more particularly liquid, flowing through the conduit 18. Most preferably, the density of the material used for valve member 14 in most food processing applications would exceed 1 gm./cc. The synthetic resin sphere 54 provides better sealing and is more responsive to fluid pressures than a sphere made of stainless steel, while at the same time not being so light as to float on the surface of the liquid within the chamber 44. The sphere 54 is sized smaller than the transverse dimension of the chamber 44, while larger than the transverse diameter of the upper throat and lower throat. Thus, the sphere 54 is retained in the chamber. The upper valve seat 48 surrounding the upper throat 46 and the lower valve seat 48 surrounding the lower throat 50 are preferably slightly domed, i.e. arcuate in both the transverse and axial directions, to effectively guide the sphere 54 and to provide a good sealing relationship with the sphere 54.

A plurality of satellite channels 56 surround the lower throat 50. Each satellite channel 56 is of a smaller transverse area than the transverse area of the lower throat 50, but most preferably the combined transverse areas of all the satellite channels, each having a constant transverse area, approximate the same transverse area as the lower throat 50. This provides for good movement of liquid from the conduit 18 into the passageway 42 of the body 12, and also provides for effective passage of air through the passageway 42 and out the satellite channels 56 even if one should be blocked.

The passageway 42 defined by the body 12 includes an vertical bore 58 normally located above the upper throat 46, including a compartment 60 which communicates with the opening 32 by a transverse tunnel 62. The motive member 16 most preferably includes a needle plunger received within the bore 58 for axial shiftable movement therewithin. The motive member 16 preferably includes a needle plunger 64 having a lowermost nose 66 for engaging the valve member 14 and an uppermost internally threaded receiver 68. Two axially spaced grooves 70 and 72 are located on the plunger 64 intermediate the nose 66 and the receiver 68 for receiving therein a respective O-rings (not shown). The motive member 16 may also include an actuation device such as an air cylinder. In the embodiment illustrated, the receiver 68 is configured to threadably receive the threaded pin 74 of a spring-biased air cylinder 76, such as, for example, a McMaster-Carr model #648k148 single action air cylinder from McMaster-Carr of Los Angeles Calif. including a spring return and having a one inch stroke. In the embodiment illustrated, a one-inch stroke is sufficient to cause the plunger 64 to move through the compartment 60 and displace the sphere 54 away from the upper valve seat 48 a sufficient distance to permit CIP liquid to move therepast. While a double-acting air cylinder could be used, it would be more expensive than the single-acting cylinder illustrated which requires only a single pneumatic inlet 88. Moreover, the spring return provides appropriate return response in the vacuum breaker valve 10 hereof.

At the uppermost end 78 of the upper section 26, the bore 58 is widened and internally threaded to threadably receive the air cylinder 76 thereon. Pressurized air controlled by appropriate pneumatic circuitry may be provided by an air line connected to the topmost portion of the air cylinder 76 which is internally threaded to receive a standard brass nipple therein. The body 12 also includes a crossport 80 providing an atmospheric break to permit grease, water and the like entering the bore 58 above the compartment 60 to inhibit the entry of such materials into the product zone by allowing such materials to escape above the blockage provided by the O-rings. Conversely, the crossport 80 provides an escape route to permit any product to escape before moving past the uppermost O-ring located in the groove 72.

FIGS. 1 and 2 illustrate the vacuum breaker valve 10 hereof during routine flow of the liquid through the conduit 18. The fluid flows along arrows 20 through the conduit from its normally upstream end 82 where the fluid, such as milk, is treated to a downstream end 84 where the fluid is delivered to a supply line, storage tank or dispenser. During routine flow as shown, air is drawn through the elbow 22 and into the passageway 42 as illustrated by arrows 86. Certain food processing regulations may require that air be drawn into the conduit 18 during routine operation to ensure the absence of any vacuum. In this operation, the valve member 14 is normally positioned on the lower valve seat 52. Air is free to pass through the satellite channels 56, which are preferably evenly circumferentially spaced around the lower throat 50.

FIG. 3 illustrates the operation of the vacuum breaker valve 10 when flow is reduced at the downstream end 84, thereby pressurizing the conduit 18 and the fluid in the chamber 44. The valve member 14 freely shifts within the chamber 44 to a sealing position in engagement with upper valve seat 48. When the sphere 54 is sealingly engaged with the upper valve seat 48, fluid within the chamber 44 is inhibited from passing through the upper valve throat 46 and into the portion of the passageway 42 above the upper valve throat 46, such as compartment 60. When the pressure within the conduit equalizes and flow returns to normal, then the sphere 54, being denser than the fluid carried by the conduit 18, does not float and obstruct the reintroduction of air from the hole 40 into the passageway 42. Thus, the sphere 54 returns to the position indicated in FIG. 2, and air is free to flow through the passageway and through the satellite channels 56 to prevent siphoning in the conduit and a reversal of flow which could cause contaminated liquid downstream to flow in an opposite direction toward upstream end 82 and contaminate the entire fluid supply.

FIG. 4 illustrates the operation of the vacuum breaker valve 10 during clean-in-place (CIP) operations. Many different CIP liquids are known to those skilled in the art, including the acid sanitizers and cleaners offered by Alfa Laval Agri, Inc. of Kansas City, Mo. and West Agro, Inc. of Kansas City, Mo. The CIP liquid is introduced into the conduit 18 as part of a cleaning operation which may include the entire processing system. Because it is desirable to clean the vacuum breaker valve 10, the fluid in the conduit 18 may be pressurized causing the valve member 14 to move into sealing engagement with the upper valve seal 48. In order to enable the CIP liquid to pass to the compartment 60 and through the hole 40, the motive member 16 is actuated to displace the valve member 14 away from sealing engagement with the upper valve seal 48 as illustrated in FIG. 3. In the preferred embodiment, the air cylinder 76 receives a pulse of pressurized air from a supply line 88, which is connected to a timer or other controller. The pulse of air pneumatically and temporarily overcomes the internal spring force within the air cylinder 76, enabling the needle plunger 64 to shift downwardly through the bore 58 and move the sphere 54 away from the upper valve seat 48 a sufficient distance to permit the CIP fluid, illustrated by arrows 90, to move therepast. The air supply to the air cylinder 76 is then terminated, and the needle plunger 64 is pulled back by the internal spring, allowing the sphere 54 to again close the upper valve throat 46. Repeated pulses of air may be supplied selectively, to permit selected amounts of CIP liquid to pass through the passageway and clean the needle plunger 64, compartment 60, transverse tunnel 62, hole 40 and elbow 22. When the system, including conduit 18 and vacuum breaker valve 10 have been cleaned, the system may return to normal operation.

It may be appreciated that the method and apparatus of the present invention enable the entire system including the vacuum breaker valve 10 to be cleaned in place without necessitating removal of the breaker valve from difficult to access locations. It may also be appreciated that the use of only a single valve member, preferably a synthetic resin sphere, makes the vacuum breaker valve extremely reliable in routine operations. Finally, the design of the preferred valve 10 enables the operation to effectively prevent the presence of a vacuum in the segment of the conduit 18 carrying the valve 10, and greatly reduces the chances for siphoning which could contaminate the system.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the liberal scope of the invention as set out in the following claims.

I claim:

1. A vacuum breaker valve adapted for coupling to a material supply conduit adapted to carry a liquid therethrough, said valve comprising:

a body presenting a normally lowermost first end having an opening adapted for fluidically communicating with the conduit, and including structure on said body remotely located from said first end defining a hole in the body, said body further defining a passageway extending between said opening and said hole, said passageway including therein an elongated chamber presenting an upper throat defining an upper valve seat, said hole being located remote from said upper valve seat and fluidically communicating said passageway with the atmosphere;

means for mounting said first end of said body to the conduit with the body in an upright orientation with said upper valve seat disposed above said first end;

a valve member located in said chamber and freely shiftable therein under the influence of a force exerted by liquid movement through said opening and into said chamber, said valve member and said upper seat being cooperatively sized to inhibit fluid flow through said upper throat when said valve member is positioned in engagement with said upper valve seat, said valve member being movable under the influence of gravity away from said upper valve seat; and a selectively actuatable motive member located adjacent said upper valve seat for selectively displacing said valve member in opposition to the force exerted against the valve member by said liquid in said chamber to an unseated position for permitting liquid flow past said valve member toward said hole.

2. A vacuum breaker valve as set forth in claim 1, wherein said valve member is substantially spherical.

3. A vacuum breaker valve as set forth in claim 2, wherein said valve member has a density greater than 1.0 gm/cc.

4. A vacuum breaker valve as set forth in claim 3, wherein said valve member is of a synthetic resin material.

5. A vacuum breaker valve as set forth in claim 1, wherein said chamber includes a lower throat defining a lower valve seat, said first end including structure defining at least one orifice separate from said lower throat and fluidically communicating said chamber with the conduit when said valve member is seated in said lower valve seat.

6. A vacuum breaker valve as set forth in claim 5, including a plurality of said orifices circumferentially spaced around said lower throat.

7. A vacuum breaker valve as set forth in claim 1, wherein said motive member includes a reciprocally shiftable plunger.

8. A vacuum breaker valve as set forth in claim 1, wherein said motive member includes a pneumatically actuated cylinder.

9. A vacuum breaker valve as set forth in claim 8, wherein said pneumatically actuated cylinder receives pressurized air through only one inlet.

10. A vacuum breaker valve as set forth in claim 1, including a lower throat defining a lower valve seat, wherein said upper valve seat is axially aligned at one end of said chamber in opposition to said lower valve seat.

11. A method of operating a vacuum breaker valve comprising the steps of:

providing a fluid conduit having a normally upstream end and a normally downstream end, and a vacuum breaker valve fluidically coupled to said conduit intermediate the upstream end and the downstream end, said vacuum breaker valve including a valve body having an opening fluidically communicating with the conduit and a hole located on said body remotely from said opening and a fluidic passageway therebetween, said passageway including a chamber presenting an upper throat defining an upper valve seat, said vacuum breaker valve further including a valve member shiftable within said chamber, said vacuum breaker valve further including a motive member located adjacent said upper throat;

passing a stream of a first fluid into said fluid conduit from said upstream end to said downstream end and introducing air from said vacuum breaker valve into the first fluid stream;

passing a stream of a second fluid into said fluid conduit and into said valve body for cleaning said conduit and said body;

locating said valve member adjacent said upper valve seat in said valve body for inhibiting the passage of fluid through said passageway to said hole; and selectively actuating said motive member to displace said valve member away from the upper valve seat to thereby permit a quantity of said second fluid to pass through said upper throat.

12. A method of operating a vacuum breaker valve as set forth in claim 11, including the step of selectively repeatedly providing a discrete pulse of pressurized air to said motive member to successively open and close said upper throat with said valve member.

* * * * *